(12) United States Patent
Herzberger et al.

(10) Patent No.: US 9,394,047 B2
(45) Date of Patent: Jul. 19, 2016

(54) MOTORIZED AEROPLANE WITH HYBRID HYDRODYNAMIC AND AERODYNAMIC STRUCTURE FOR TAKING OFF AND LANDING ON WATER, THE GROUND OR SNOW

(75) Inventors: Erick Herzberger, Annecy (FR); Luc Bernole, Le Bourget du Lac (FR); Benoit Senellart, Chambery (FR); Jean-Francois Clavreul, Chambery (FR); Satya Remond, La Voulte-sur-Rhone (FR); Cedric Petrini, Barby (FR)

(73) Assignee: LISA AERONAUTICS, Le Bourget du Lac (FR)

( * ) Notice: Subject to any disclaimer, the term of this patent is extended or adjusted under 35 U.S.C. 154(b) by 114 days.

(21) Appl. No.: 13/981,193

(22) PCT Filed: Jan. 25, 2012

(86) PCT No.: PCT/FR2012/000033
§ 371 (c)(1),
(2), (4) Date: Jul. 23, 2013

(87) PCT Pub. No.: WO2012/101352
PCT Pub. Date: Aug. 2, 2012

(65) Prior Publication Data
US 2013/0299632 A1    Nov. 14, 2013

(30) Foreign Application Priority Data
Jan. 25, 2011  (FR) ..................................... 11 00220

(51) Int. Cl.
*B64C 25/54* (2006.01)
*B64C 35/00* (2006.01)
*B64C 25/10* (2006.01)

(52) U.S. Cl.
CPC ................. *B64C 25/54* (2013.01); *B64C 25/10* (2013.01); *B64C 35/006* (2013.01); *B64C 35/008* (2013.01)

(58) Field of Classification Search
CPC ........ B63B 1/30; B63B 1/322; B64C 35/005; B64C 35/006; B64C 35/008; B64C 35/001; B64C 5/10; B64C 25/52; B64C 25/54; B64C 25/10
See application file for complete search history.

(56) References Cited

U.S. PATENT DOCUMENTS 1,410,876 A * 3/1922 Bell et al. ...................... 114/274
2,214,945 A * 9/1940 Weihmiller ............... 244/102 R
(Continued)

FOREIGN PATENT DOCUMENTS

FR    2 313 254 A1    12/1976
FR    2 856 655 A1    12/2004
(Continued)

OTHER PUBLICATIONS

Leon Kaplan, "The Hydrofoil and Float Combination," Aug. 14, 2008. http://www.seaplanes.org/mambo/index.php?option=com_content&task=view&id=221&Itemid=1, accessed Apr. 4, 2015.*
(Continued)

*Primary Examiner* — Tien Dinh
*Assistant Examiner* — Alexander V Giczy
(74) *Attorney, Agent, or Firm* — Oliff PLC

(57) ABSTRACT

An aeroplane includes a fuselage having a pair of hydrofoils providing hydrodynamic lift and stabilization arranged in the form of an inverted V. The junction between each hydrofoil and fuselage is situated forward the center of gravity of the aeroplane. The distance separating the junction between each hydrofoil and the fuselage, with respect to the center of gravity of the aeroplane is comprised between 0 and 170% of the mean aerodynamic chord of the main wing of the aeroplane, preferably between 20% and 135%. Each hydrofoil is inclined downwards, from its leading edge in the direction of its trailing edge. The straight line connecting these two edges form, a nominal pitch angle comprised between 2 and 12°, preferably between 6 and 8°. A part of the hydrofoil is located beneath a horizontal tangential plane of the aeroplane; each hydrofoil has a flexible intermediate section allowing the hydrofoil to flex upwards.

11 Claims, 7 Drawing Sheets

(56) References Cited

U.S. PATENT DOCUMENTS

| | | | | |
|---|---|---|---|---|
| 2,887,081 | A * | 5/1959 | Bader | B63B 1/30 114/281 |
| 3,139,059 | A * | 6/1964 | Hanford, Jr. | 114/273 |
| 3,164,119 | A * | 1/1965 | Emmanuel | B63B 1/242 114/274 |
| 4,080,922 | A | 3/1978 | Brubaker | |
| 5,237,952 | A * | 8/1993 | Rowe | B63B 11/04 114/280 |
| 5,474,011 | A * | 12/1995 | Steinberg | 114/282 |
| 5,715,572 | A * | 2/1998 | Steinberg | 16/221 |
| 7,601,041 | B2 * | 10/2009 | McCarthy | 441/64 |
| 7,644,672 | B2 * | 1/2010 | Welbourn | 114/39.24 |
| 7,900,877 | B1 * | 3/2011 | Guida | 244/199.4 |
| 8,720,354 | B2 * | 5/2014 | Ketterman et al. | 114/39.24 |
| 2004/0182301 | A1 * | 9/2004 | Borman | B60V 3/06 114/271 |
| 2004/0237872 | A1 * | 12/2004 | Markie | 114/273 |
| 2006/0284009 | A1 * | 12/2006 | Kismarton | 244/104 LS |
| 2006/0284010 | A1 * | 12/2006 | Meekins | 244/105 |
| 2007/0013227 | A1 * | 1/2007 | Weinstein | B64C 25/36 301/124.1 |
| 2009/0127388 | A1 | 5/2009 | Herzberger et al. | |

FOREIGN PATENT DOCUMENTS

| | | | | |
|---|---|---|---|---|
| GB | 760 525 | A | 10/1956 | |
| GB | 2161441 | A * | 1/1986 | B63H 25/10 |
| WO | WO 2007/141425 | A1 | 12/2007 | |
| WO | WO 2011/005226 | A2 | 1/2011 | |

OTHER PUBLICATIONS

Wikipedia, Dihedral (aeronautics) page. http://en.wikipedia.org/wiki/Dihedral_(aeronautics), accessed Apr. 4, 2015.*

* cited by examiner

MOTORIZED AEROPLANE WITH HYBRID HYDRODYNAMIC AND AERODYNAMIC STRUCTURE FOR TAKING OFF AND LANDING ON WATER, THE GROUND OR SNOW

BACKGROUND OF THE INVENTION

The invention relates to a motorized aeroplane with landing gear comprising a fuselage provided at its base with a pair of hydrofoils configured as ailerons providing hydrodynamic lift and stabilization arranged downwards in the form of an inverted V.

STATE OF THE ART

Known hydroplane fuselages generally comprise the shape of a keel or hull at the front, and a recess in the mid-part of the base, which is immersed in the water. The suction effect when taking off on water is compensated by the presence of the recess, but once in the air after take-off, an aerodynamic effect takes place with formation of a turbulent flow which increases the drag of the aeroplane and the fuel consumption.

An amphibious aeroplane has already been proposed comprising protuberances in the form of salient covers integrating a part of the stow-away landing gear. These protuberances have no dynamic lift function, providing at the most a static stability function to form floats.

Aeroplanes with hydrofoils also exist for landing and taking off on water, but they are not provided with landing gear.

Furthermore, known aeroplanes performing assistance and search on snow-covered ground have retractable skis which are not stowed away inside the fuselage.

The applicant proposed, by WO-A-2007/141425, an aeroplane the fuselage of which is provided at its base with a pair of hydrofoils forming hydrodynamic stabilization ailerons arranged downwards in the form of an inverted V. Furthermore, the legs of the landing gear are each articulated around a swivel axis arranged on the hydrofoils. The presence of the hydrofoils generates a hydrodynamic lift effect when taking off on water, as soon as a certain speed is reached, so that the aeroplane can then quickly leave the water. Landing on water takes place gently and without any bumping due to the guiding effect of the hydrofoils.

The document GB 760,525 describes an aeroplane with a hydrofoil device having a V-shaped profile and a pitch which do not enable an intrinsic stability to be obtained.

OBJECT OF THE INVENTION

The polyvalent aeroplane described above, proposed by WO-A-2007/141425, proves to be globally satisfactory. The object of the invention is however to improve the performances of this aeroplane even further, in particular in terms of stability.

The aeroplane according to the invention is remarkable in that:
  the junction of each hydrofoil with the fuselage is situated forward from the centre of gravity of the aeroplane,
  the distance separating the junction of each hydrofoil from the fuselage, with respect to the centre of gravity of the aeroplane, is comprised between 0 and 170% of the mean aerodynamic chord of the main wing of the aeroplane, preferably between 20% and 135%,
  each hydrofoil is inclined downwards, from its leading edge in the direction of its trailing edge, the straight line connecting these two edges forming, with a horizontal tangential plane PTQ passing through the bottom of the fuselage, a nominal pitch angle (c) comprised between 2 and 12°, preferably between 6 and 8°,
  the part of the hydrofoil located beneath said tangential plane (PTQ) is situated forward from the centre of gravity of the aeroplane.

The pitch of the foil is formed by the angle formed in a plane parallel to the plane of symmetry of the aeroplane, between the tangential plane PTQ on the one hand and the line connecting the leading edge to the trailing edge of the profile of the hydrofoil on the other hand. When the aeroplane is in asymmetrical straight trajectory and the plane PTQ is parallel to the surface of the water, the pitch of the hydrofoils has to be the same as the maximum fineness pitch of the hydrofoils to within 4°. If a disturbance makes the aeroplane deviate from its trajectory and gives it an angle of yaw, the fact that the hydrofoils are pass-through will enable a new lift equilibrium state of the aeroplane to be obtained by difference of immersion of the hydrofoils (induced roll). Combined with the aerodynamic stabilization, the fact that the hydrofoils are wedged close to maximum fineness procures a drag differential on the hydrofoils which will compensate the yaw destabilizing moment due to the centre of gravity. This results in a stabilizing effect for the aircraft.

The specific positioning of the two hydrofoils forward from the centre of gravity, combined with an incisive leading edge, gives the aeroplane an optimum stability. The behaviour of this incisive profile, in particular the modification of its fineness according to the incidence, does in fact enable a yaw destabilizing moment to be treated by drag differential.

Other technical features can be used either alone or in combination:
  in front view, the angle of incline of each hydrofoil with respect to the horizontal is comprised, in the normal position of the aeroplane, between 10° and 50°, preferably between 10 and 30°.
  the aeroplane comprises pivoting means of each hydrofoil so as to modify this angle of incline in a range of values comprised between −10° and 30°, in particular for the operating phases when it is not in the water.
  each hydrofoil is provided with a flexible intermediate section enabling movement of its free end in service, according to the forces to which this hydrofoil is subjected.
  in top view, the angle of incline towards the rear of each hydrofoil with respect to a transverse axis is comprised, in the normal position of the aeroplane, between 0 and 60°, preferably between 20 and 40°
  the aeroplane comprises adjustment means, in service, of this pitch angle within a range of more or less 10° with respect to its nominal value.
  the external side of each hydrofoil is extended by an aileron, extending in oblique manner both upwards and opposite from the fuselage.
  damping means are provided connecting each hydrofoil to the fuselage.
  each hydrofoil is at least partially retractable inside the fuselage.
  at least one hydrofoil is provided with a platform performing a footboard function.
  the aeroplane comprises at least one additional hydrofoil placed in midway manner with reference to the longitudinal axis of the aeroplane, backward from the centre of gravity.
  the trailing edge and/or leading edge of each hydrofoil is formed by an aileron movable with respect to the rest of the hydrofoil.

BRIEF DESCRIPTION OF THE DRAWINGS

Other advantages and features will become more clearly apparent from the following description of a particular embodiment of the invention given for non-restrictive example purposes only and represented in the appended drawings, in which.

DETAILED DESCRIPTION OF A PREFERRED EMBODIMENT OF THE INVENTION

Figure 1:
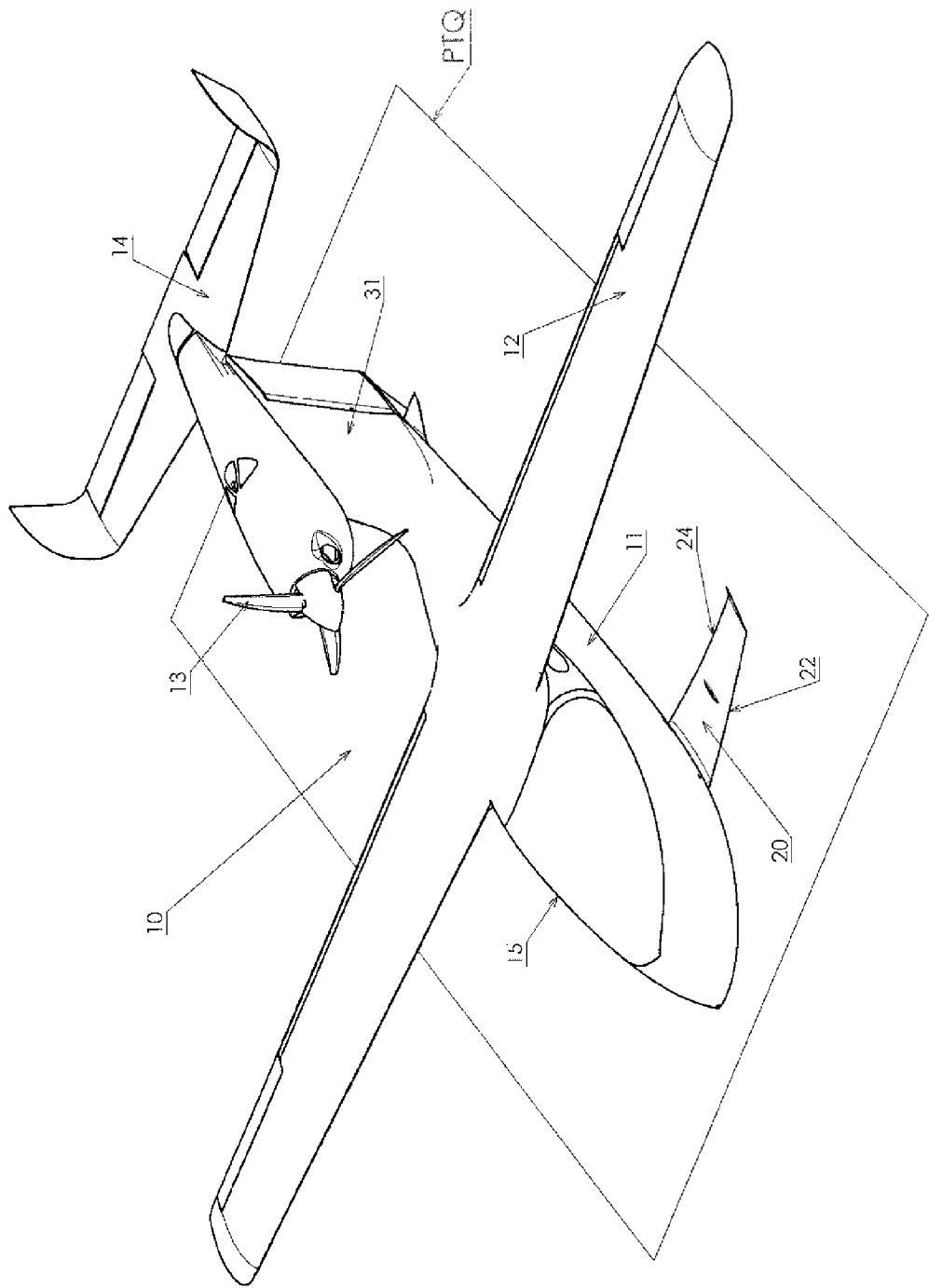
FIG. 1 is a schematic perspective view of the motorized aeroplane according to the invention.

In the different figures, a motorized aeroplane 10, in particular a leisure plane of small size, comprises a longitudinal fuselage 11, a transverse main wing 12 with variable lift, a propeller engine 13 associated with the tail unit 14 supported by the vertical stabilizer 31, and a cockpit 15.

Such an aeroplane 10, of polyvalent type, has a hydrodynamic and aerodynamic structure suitable for taking off and landing on water, the ground or snow. The invention also applies to any other type of aeroplanes in which propeller engine 13 can be replaced by a twin engine or a turboprop engine.

Cockpit 15 is placed in the mid-plane of symmetry, forward from wing 12. Wing 12 can be of the type described in the document FR-A-2856655. Opposite from wing 12, the base of fuselage 11 is provided with a pair of hydrofoils 20 and 20' which will be described in greater detail in the following.

A position called "normal" is defined for this aeroplane, for which wing 12 is horizontal and is situated above hydrofoils 20 and 20'. With reference to this normal position, the front edge or leading edge 22 and 22', and the rear edge or trailing edge 24 and 24', are designated for each hydrofoil. The top surface 26 and 26' and bottom surface 28 and 28' of each hydrofoil 20 and 20' are also designated. Finally their inner side, adjacent to the fuselage, is noted 30 and 30', and their outer side, opposite this fuselage, is noted 32 and 32'.

Inner side 30 or 30' of each hydrofoil 20 or 20' is extended by a respective connecting section 34 or 34' performing connection to the fuselage. Finally, outer side 32 or 32' of each hydrofoil 20 or 20' is terminated by a respective aileron 36 or 36'. The latter is salient in oblique manner, i.e. upwards with reference to the normal position of the aeroplane, and also opposite from the fuselage.

Figure 2:
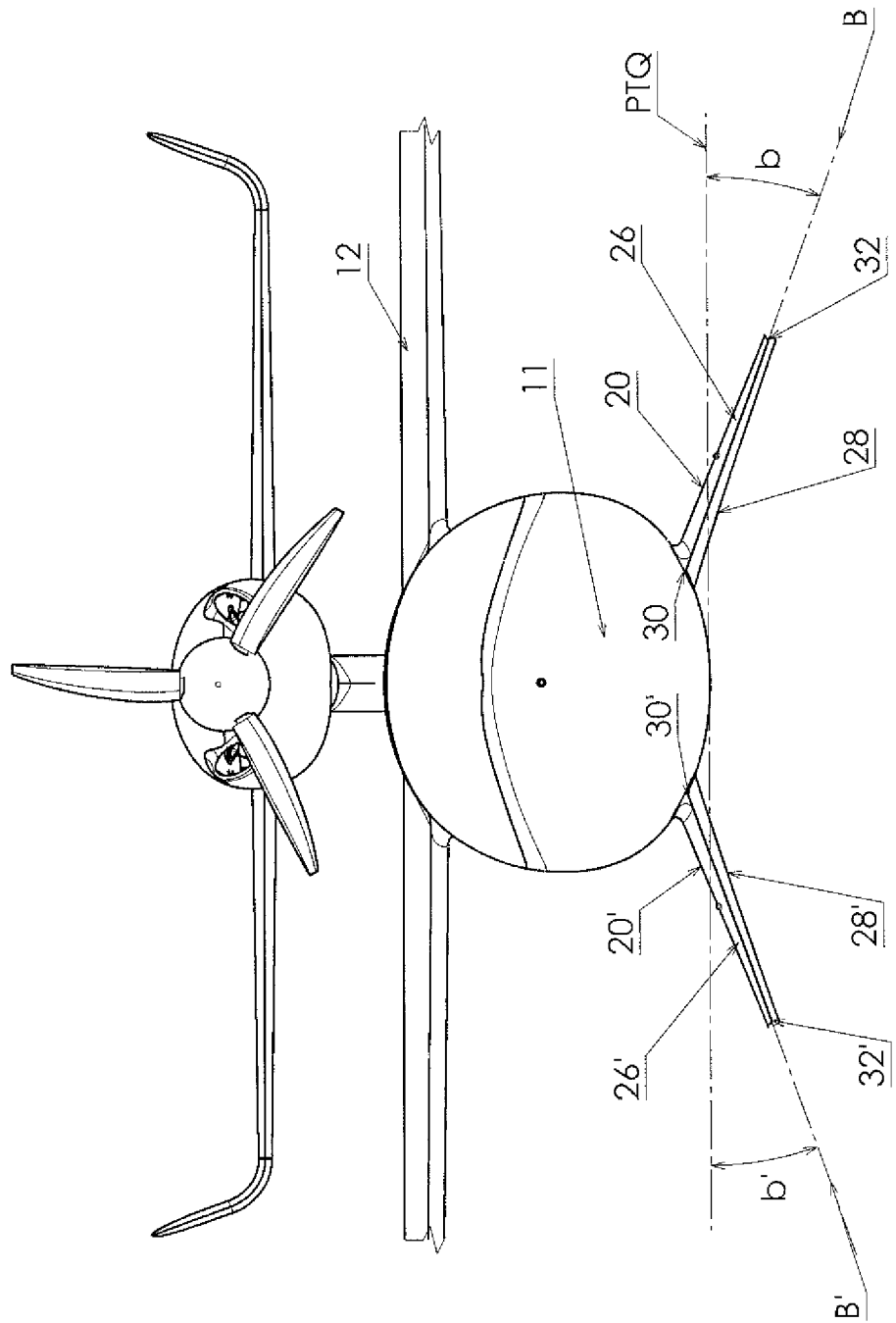
FIGS. 2 and 3 are respectively front and bottom views, partially illustrating the aeroplane of FIG. 1, on an enlarged scale.
Figure 3:
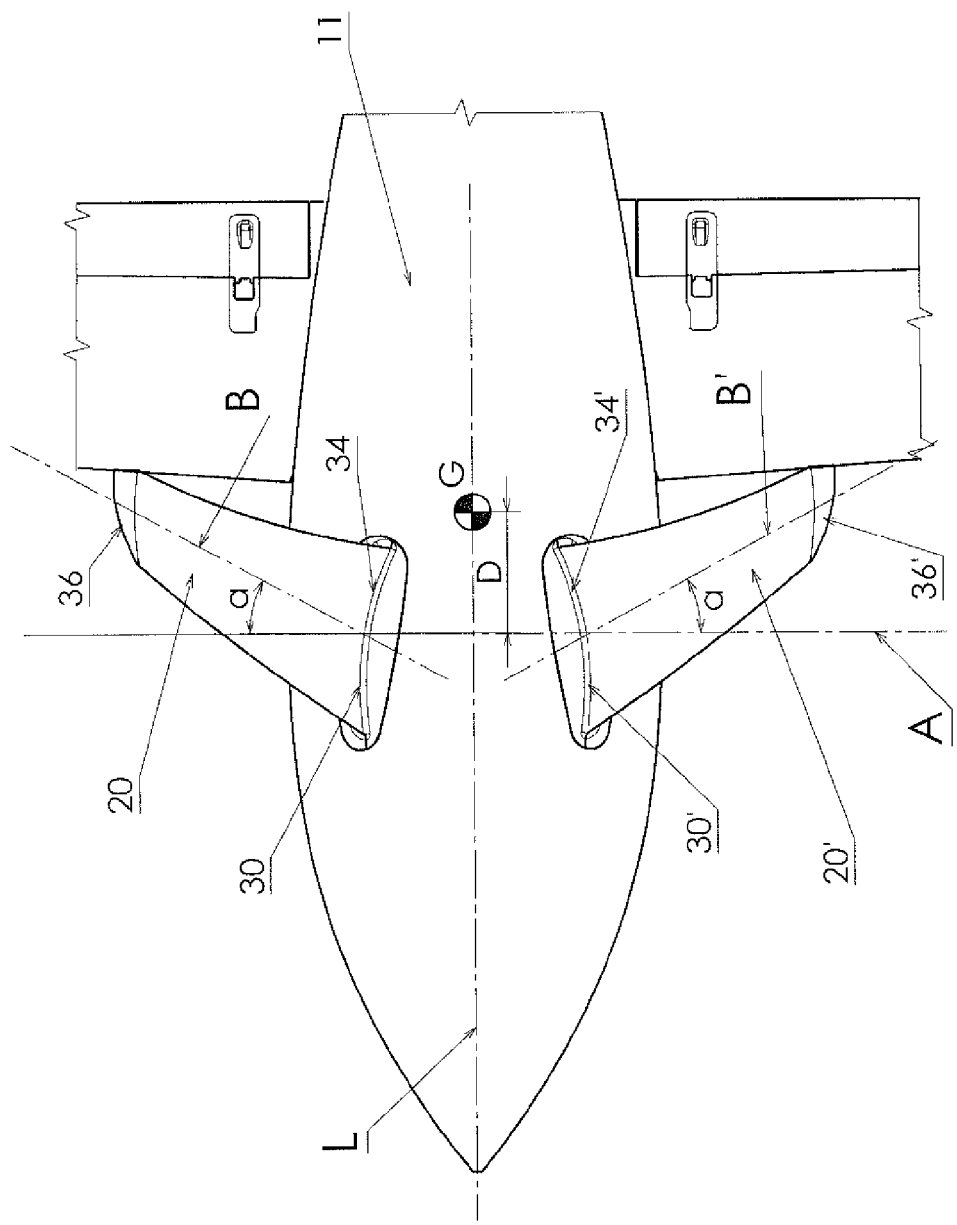
Figure 6:
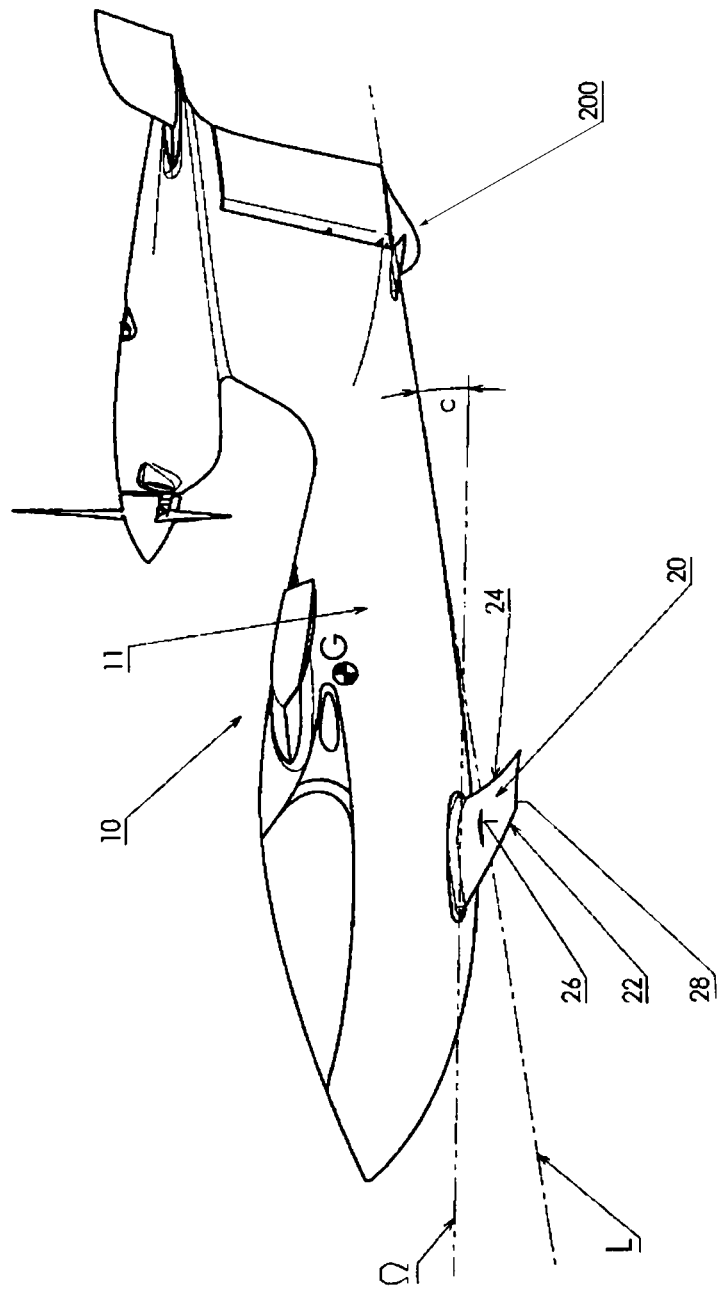
FIG. 6 is a side view of the aeroplane of the previous figures.

With reference to FIGS. 1 and 2, the tangential plane passing through the bottom of the fuselage can be noted PTQ. With reference to FIGS. 3 and 6, the median longitudinal axis of the aeroplane, extending in the plane PTQ, is noted L. Finally, the centre of gravity is noted G, and the axis perpendicular to L, joining the middle of inner sides 30 and 30', is noted A.

Hydrofoils 20 and 20', which are symmetrical with respect to axis L, are placed forward from the centre of gravity G, in the sense that the above-mentioned axis A is placed forward from G. For non-restrictive example purposes, the distance D separating A and G, along the axis L, is comprised between 0 and 170% of the mean aerodynamic chord of main wing 12, preferably between 20% and 135%. In conventional manner, this mean aerodynamic chord CMA is defined as the ratio between the total lift surface of wing 12 and the wing span, i.e. the distance between its two lateral ends.

With reference to FIG. 3, i.e. in bottom view, the hydrofoils are inclined towards the rear. The median main axes of each hydrofoil, passing through the middle of the two sides 30 and 32, or 30' and 32', are noted B and B'. The angles called sweepback angles between either A and B or A and B', are noted a and a'. Under these conditions, a and a' are each comprised between 0 and 60°, preferably between 20 and 40°.

With reference henceforth to FIG. 2, i.e. in front view, hydrofoils 20 and 20' are inclined downwards forming an inverted V. The angles called anhedral angles between either the median main axis B and the horizontal or the median main axis B' and the horizontal, are noted b and b'. Under these conditions, b and b' are each comprised between 10 and 50°, preferably between 10 and 30°.

Figure 5:
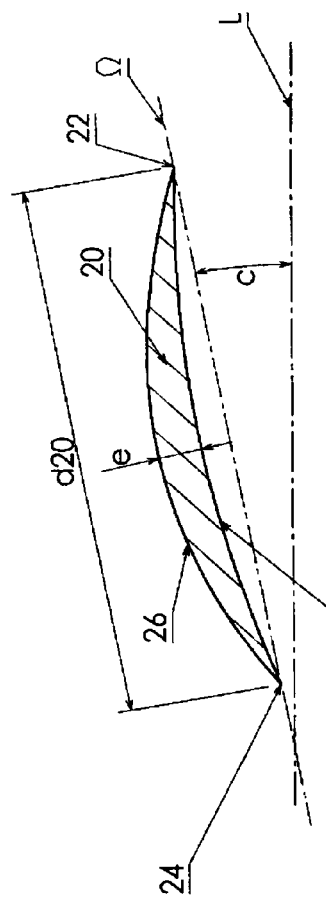
FIG. 5 is a transverse cross-sectional view along the plane IV visible in FIG. 4.

FIG. 5 illustrates a transverse cross-section of the hydrofoil, in a plane IV perpendicular to its main axis B. Leading edges 22 and trailing edges 24 can be seen, as can top surface 26 and bottom surface 28. It can be observed that this hydrofoil is inclined downwards in the direction of the trailing edge, i.e. that the latter is placed underneath the leading edge in the normal position. If the straight line joining these two edges is noted $\Omega$, it forms an angle c, called nominal pitch angle, with the longitudinal axis L, an angle which is comprised between 2 and 12°, preferably between 6 and 8°.

As an alternative embodiment that is not represented, a device can be provided enabling this pitch angle to be made to vary, in operation, within a range of more or less 10° with respect to its nominal value defined above.

This device can be controlled by an actuator, mechanically controlled, or simply actuated according to the force.

Figure 9:
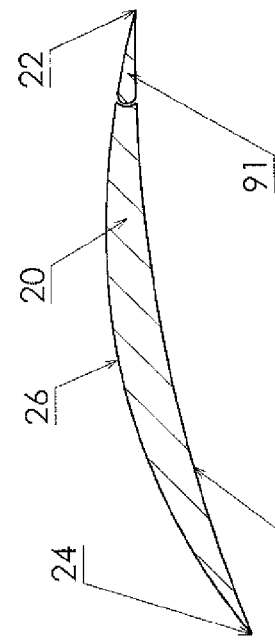
Figure 10:
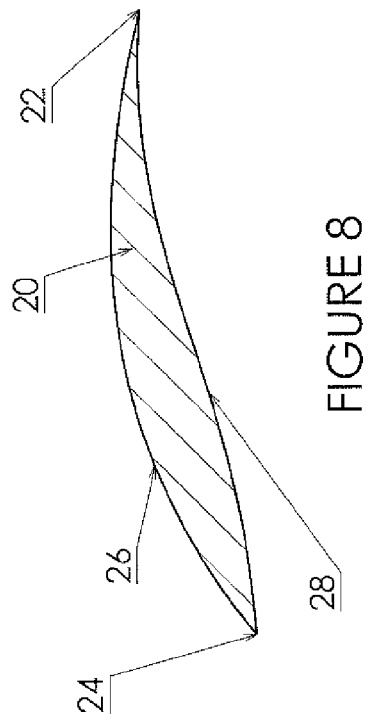

FIGS. 9 and 10 illustrate a transverse cross-section similar to FIG. 5, with arrangements forming an alternative to this variation of the pitch. It can in fact be provided to only have a part of the profile of the hydrofoil being mobile, on the trailing edge and/or on the leading edge, by means of ailerons noted 90 on the cross-section of FIGS. 9 and 91 in FIG. 10. The possibility of movement of each aileron, with respect to the rest of the hydrofoil, is for example permitted by swivelling around an axis extending from rear to front in these FIGS. 9 and 10.

Referring again to this FIG. 5, it can be noted that the two surfaces, respectively top surface 26 and bottom surface 28, have a concaveness which is oriented upwards. They are thus both flexed upwards, i.e. in other words, they are at all points placed below their tangent. This gives the two edges of the hydrofoil an incisive profile.

Figure 7:
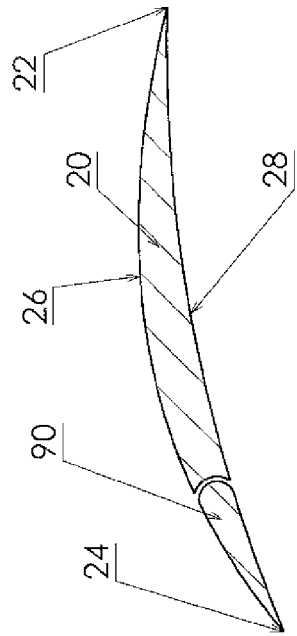
FIGS. 7, 8, 9 and 10 are transverse cross-sectional views, analogous to FIG. 5, illustrating four alternative embodiments of the invention.
Figure 8:
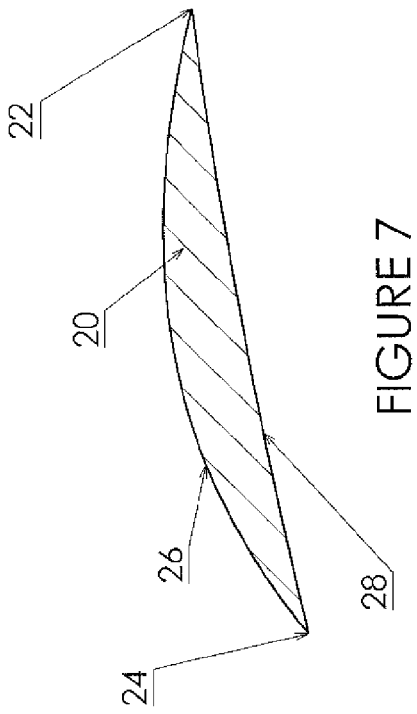

As an alternative embodiment, it can be provided for bottom surface 28 to be straight, between the two edges 22 and 24, as shown in FIG. 7. It can also be provided for this surface 28 to present a straight or concave profile as described above, near to the leading edge only, but on the other hand not near the trailing edge or in the central region (see FIG. 8). According to a last possibility, not represented, it can finally be provided for this surface 28 to present a straight or concave profile as described above, near to the leading edge and to the trailing edge, but on the other hand not in the central region.

What is meant by 'near to' is an axial dimension of at least 15% of the total distance between the two edges, denoted as d20 in FIG. 5.

Again with reference to FIG. 5, the maximum thickness of the hydrofoil, seen in transverse cross-section, is defined as e in FIG. 5. In advantageous manner, this thickness is small i.e. the ratio (e/d20) between this thickness and the total distance of the hydrofoil is comprised between 0.02 and 0.15.

The aeroplane according to the invention can further be equipped with additional functionalities which are not represented in the different figures.

Thus, for take-off and landing on the ground or on snow, the aeroplane can be equipped with mixed landing gear composed of wheels and skis, which can be retracted into the fuselage by any suitable means. The aeroplane can further comprise, at the front of the fuselage, an additional landing wheel, also of retractable type, which can be associated with a ski.

The different figures correspond to a configuration in flight, and for take-off and landing on water, in which the landing gear is stowed away in the smooth fuselage 11. When taking off on water, the two hydrofoils 20 generate a hydrodynamic lift effect as soon as a certain speed is reached. The aeroplane 10 can then leave the surface of the water quickly. Landing on water takes place gently and with precision due to the smooth fuselage 11 and to the guiding effect of hydrofoils 20.

The aeroplane according to the invention can naturally adopt other configurations, for take-off and landing on the ground or on snow. For this purpose, this aeroplane can have identical or similar mechanical characteristics to those described in WO-A-2007/141425.

Figure 4:
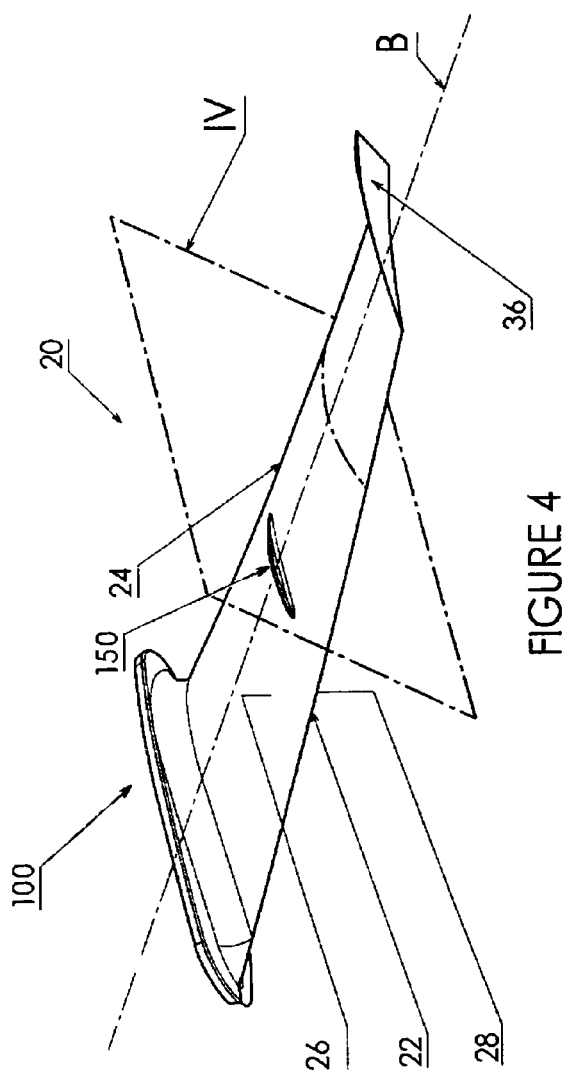
FIG. 4 is a perspective view of a hydrofoil equipping the fuselage of the aeroplane of the previous figures.

It can further be provided for the top surface of at least one of the two hydrofoils to be formed in such a way that it enables the user to access the cockpit, using the hydrofoil as a footboard, as denoted by platform 150 in FIG. 4.

Furthermore, the connection between each hydrofoil and the fuselage can be equipped with damper 100. Each hydrofoil can also be totally or partially retractable to the inside of the fuselage.

Figure 11:
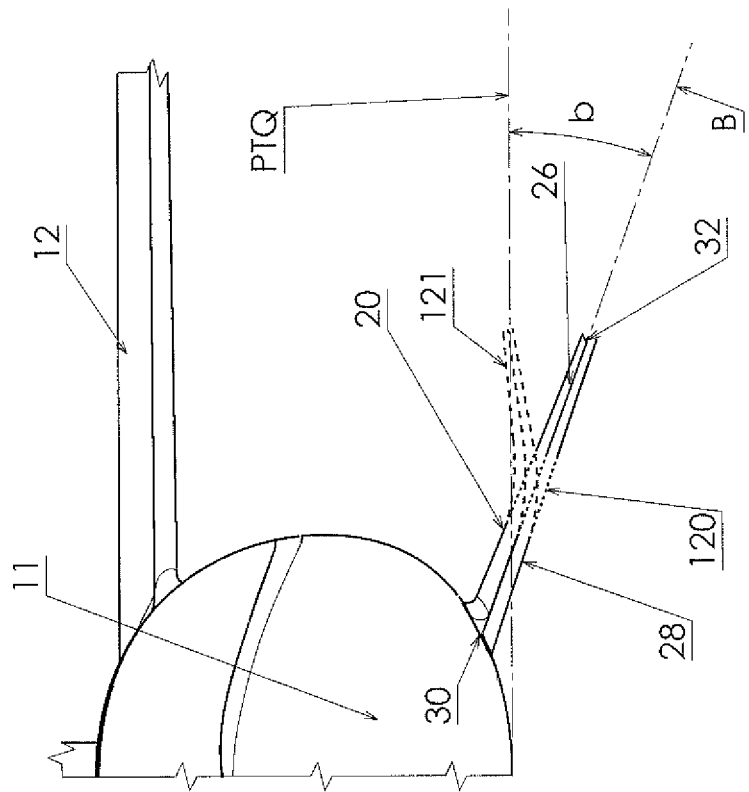
FIGS. 11 and 12 are front views similar to FIG. 2, illustrating additional alternative embodiments of the invention.

FIG. 11 illustrates an additional alternative embodiment in which the hydrofoils can swivel around a substantially longitudinal axis so as to modify the dihedron angle b, as defined above. Thus, in particular in operation out of the water, an actuator that is not represented, of any suitable type, makes each hydrofoil swivel to the position noted 110 in FIG. 11. In this way, this dihedron angle is brought down to low or negative values comprised for example between −10° and 30°.

Figure 12:
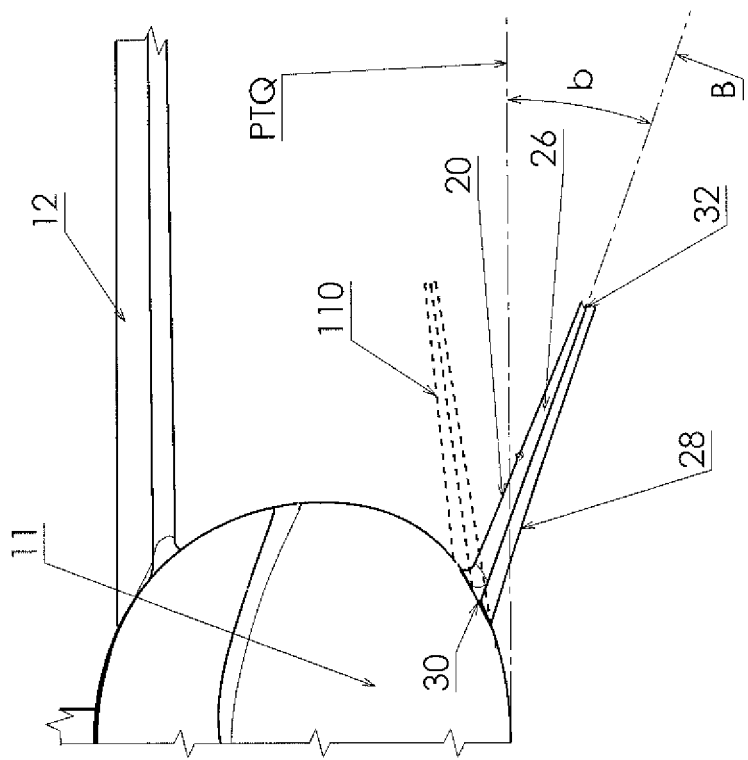

FIG. 12 illustrates another alternative embodiment in which an intermediate section 120 of the hydrofoil has an internal structure designed to allow a certain flexibility. In this manner, the free end of the hydrofoil has a certain possibility of movement with respect to the body of the hydrofoil, so that it can for example adopt the position referenced 121. The dihedron angle b and the pitch angle c relative to this end of the foil, therefore adjust in natural manner to the force undergone by the latter.

Finally, an additional hydrofoil 200 can be provided, placed to the rear of the centre of gravity G. This can provide an aid, by creating a hydrodynamic balancing support and by enabling improved directional control. This rear hydrofoil can be connected to the mobile directional tail unit, or at least have a mobile part which performs the directional function of the aeroplane in the water.

The invention claimed is:

1. A motorized aeroplane comprising:
    a fuselage having a base;
    a landing gear comprised of wheels and skis, the gear being retractable into the fuselage;
    at least two hydrofoils provided at the base of the fuselage, the hydrofoils being configured to provide hydrodynamic lift and stabilization arranged downwards of the aeroplane in a form of an inverted V, wherein:
    a junction between each hydrofoil and the fuselage is situated forward from a center of gravity of the aeroplane,
    a distance separating the junction between each hydrofoil and the fuselage, with respect to the center of gravity of the aeroplane is greater than 0% but not more than 170% of a mean aerodynamic chord of a main wing of the aeroplane,
    each hydrofoil is inclined downwards from a respective leading edge in a direction of a respective trailing edge, and a straight line connects the leading and trailing edges such that, with a horizontal tangential plane passing through the bottom of the fuselage, a nominal pitch angle of each hydrofoil is between 2° and 12°,
    a part of each hydrofoil is located beneath the horizontal tangential plane of the aeroplane, and another part of each hydrofoil is disposed forward from the center of gravity,
    as viewed from a front view of the aeroplane, a first anhedral angle of each hydrofoil with respect to the horizontal tangential plane is, in a normal position of the aeroplane, between 10° and 50°, and
    each hydrofoil is provided with a flexible intermediate section allowing a free end of the hydrofoil to flex upwards to the horizontal tangential plane passing through the bottom of the fuselage.

2. The aeroplane according to claim 1, wherein a bottom surface of each hydrofoil is straight or has a concaveness that is directed upwards in the area of a trailing edge of each hydrofoil.

3. The aeroplane according to claim 1, wherein, as viewed from above the aeroplane, a sweepback angle of each hydrofoil with respect to a transverse axis of the aeroplane and measured from the transverse axis towards a rear of the aeroplane is, in the normal position of the aeroplane, between 0° and 60°.

4. The aeroplane according to claim 1, further comprising:
    at least one aileron for adjusting the pitch angle in a range of approximately 10° with respect to the nominal position of the pitch angle.

5. The aeroplane according to claim 1, wherein the external side of each hydrofoil is extended by an aileron extending in oblique manner both upwards and opposite from the fuselage.

6. The aeroplane according to claim 1, wherein
    a plurality of dampers are provided, and
    each damper connects each hydrofoil to the fuselage.

7. The aeroplane according to claim 1, wherein each hydrofoil is at least partially retractable inside the fuselage.

8. The aeroplane according to claim 1, wherein at least one hydrofoil is provided with a platform configured as a footboard.

9. The aeroplane according to claim 1, further comprising:
    at least one additional hydrofoil, disposed in a median of the aeroplane with reference to a longitudinal axis of the aeroplane, and in the center of gravity of the aeroplane.

10. The aeroplane according to claim 1, wherein at least one of the trailing edge or the leading edge of each hydrofoil is formed by an aileron that is movable with respect to a remainder of the respective hydrofoil.

11. The aeroplane according to claim 1, wherein:
each hydrofoil includes, as viewed in a transverse cross-section, a top surface having a concaveness that is directed upwards, in the normal position of the aeroplane, and
each hydrofoil includes, as viewed in a transverse cross-section, a bottom surface that is straight or has a concaveness directed upwards in an area of the leading edge of the respective hydrofoil such that the leading edge of the respective hydrofoil has an incisive shape.

* * * * *